May 8, 1945.  H. R. JOHNSON  2,375,367
CHIP BREAKER
Filed Dec. 9, 1942
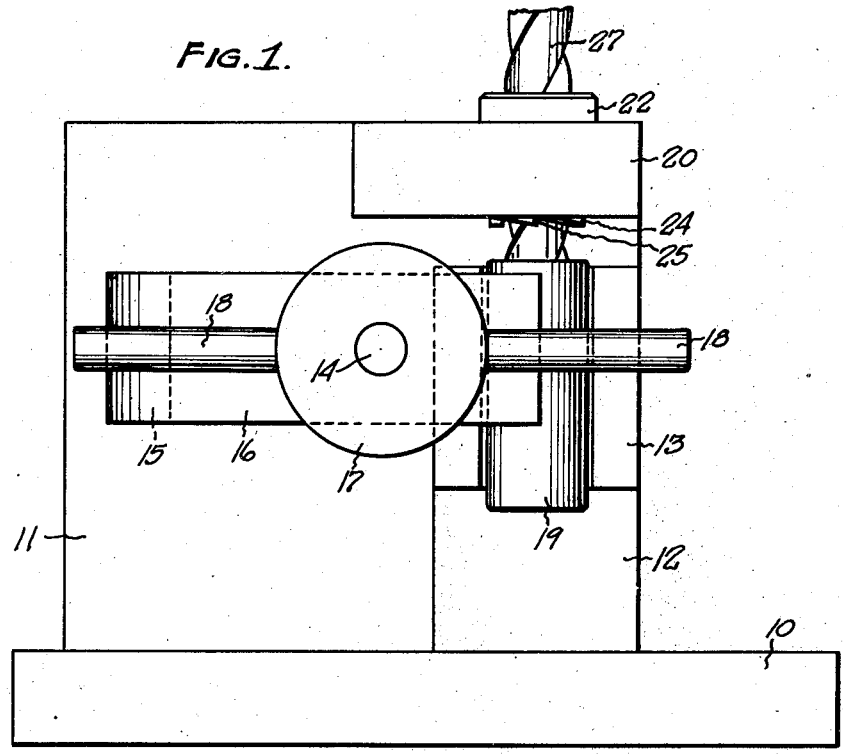
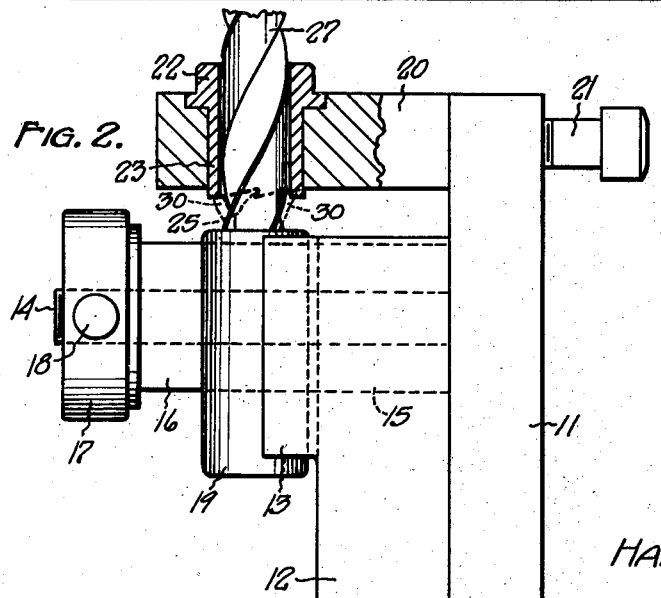
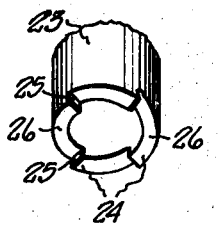
HAROLD R. JOHNSON.
INVENTOR.
BY Oltsch & Knoblock
attorneys.

Patented May 8, 1945

2,375,367

UNITED STATES PATENT OFFICE 2,375,367

CHIP BREAKER

Harold R. Johnson, Mishawaka, Ind.

Application December 9, 1942, Serial No. 468,381

7 Claims. (Cl. 77—62)

This invention relates to a chip breaker, and more particularly to a device for breaking chips cut by the drill of a drill press from a work piece mounted in a work holder on the press.

Work holders commonly have drill bushings associated therewith and positioned above the work piece for free rotative passage of a drill therethrough. If the lower end of the bushing is close to the top of the work piece, the elongated helical chips cut by a drill pass upwardly in the flutes of the drill and remain in said drill flutes at the portion of the drill within the drill bushing. Thus the curled elongated chips are discharged at the top of the work holder, where they are accessible for ready removal and do not interfere greatly with the drilling operation or with the application and removal of successive work pieces to and from the work holder. However, in many cases, the work piece is of such size and shape that a substantial space exists between the top of the work piece, which is clamped in the work holder, and the lower end of the bushing. In such cases, the elongated curled or helical chip cut by the drill may not remain within the drill flute when it reaches the lower end of the drill bushing, so that it strikes the end of said bushing and is deflected laterally outwardly thereby and winds around the drill. The deflected chip clogs or fills the space between the bushing and the work piece, making it difficult to remove and apply successive work pieces. Thus, if chips clog the space between the bushing and the work holder clamp, the operator is required to spend time in removing them. This entails a definite hazard because the edges of the chip are usually very sharp, and hence the operator is likely to experience cuts on his hands. Clogging of the chips in the manner described also entails the disadvantage of interfering with proper lubrication of the drill, so that the useful life of a drill is measurably shortened.

The primary object of this invention is to provide a chip breaker by means of which the above described disadvantages may be eliminated or overcome.

A further object is to provide a device by means of which a chip which is cut by a drill and which projects from the flutes of the drill may be cut or broken into small pieces when it strikes the lower end of the drill bushing.

A further object is to provide a drill bushing having a lower or inner end provided with a plurality of circumferentially spaced radially positioned cutting teeth presenting abrupt faces and cutting edges to a chip fed helically into abutting engagement therewith.

A further object is to provide a drill bushing with a serrated lower or inner end having a plurality of cutting edges.

Other objects will be apparent from the description and appended claims.

In the drawing:

Fig. 1 is a view in front elevation illustrating a work holder mounting a work piece being drilled by a drill passing through a drill bushing and incorporating my chip breaker.

Fig. 2 is a view in side elevation with parts shown in section.

Fig. 3 is a fragmentary perspective view of a drill bushing having a chip-breaking serrated end.

Referring to the drawing, which illustrates one embodiment of the invention, the numeral 10 designates the base plate of a work holder. An upright plate portion 11 is carried by base 10. A block 12 is secured to base 10 and plate portion 11, said block including a forwardly projecting portion 13 provided with a vertical V-shaped recess in its front face. A horizontal screw threaded stud 14 is secured to plate 11 adjacent to block 12 and projects forwardly beyond the front face of portion 13 of block 12. An L-shaped clamp member havin gone leg 15 thereof bearing at its end against plate 12, and a leg 16, is provided with an opening in leg 16 which fits slidably and tiltably around stud 14. A retainer 17 is screw threaded on stud 14 and is provided with laterally projecting arms 18 by means of which the retainer may be rotated to tilt the clamp element about the end of leg 15 thereof as a fulcrum. A work piece 19, such as a forging, is seated in the recess in block 12, and is pressed upon and locked in operative position in said recess by leg 16 of the L-shaped clamp element.

A forwardly extending horizontal plate 20 is detachably secured by bolts 21 to the upper end of plate 11 in spaced relation above block 12. The plate 20 is constructed to cooperate with the work holder to accommodate the work piece 19 and the bore to be drilled therein. Thus the block is provided with a bore concentric with the axis of the bore to be drilled in the work piece.

A drill bushing 22 is seated in said bore. The drill bushing may be of any desired construction and includes a cylindrical body portion 23 of a length to preferably project below the bottom face of plate 20. The lower projecting end of cylindrical portion 23 of the bushing is notched to form a circumferential series of equispaced similar teeth 24. Teeth 24 preferably have one abrupt face 25 and a gradually tapered face 26. Face 25 extends longitudinally of the drill bushing and is preferably slightly undercut, i. e., lies in a plane inclined slightly relative to the axis of the bushing in the same direction that the face 26 inclines relative to the axis. This inclination of face 25 is preferably in the same direction from the apex to the base of said face as the direction of rotation of the drill 27. Consequently as faces 26 are engaged by material fed helically by said drill, they guide said material into the acute angled radial notches and against the abrupt faces 25 of the next tooth, and any movement of the material along the abrupt faces 25 is in an inward or rearward direction toward the base of the face to insure retention of the material against sliding or displacement until the material is broken into chips. The edges of the teeth, and particularly the edges at the apieces of the teeth and at the inner side of faces 25, are sharp and constitute cutting edges.

Drill 27 has a free rotative fit within the drill bushing. It will be understood that the drill 27 is mounted on a drill press, and that the work holder is mounted upon the work holding platform of said drill press.

During a drilling operation the chips cut from the work piece 19 assume helical shape and are discharged by passing upwardly through the flutes of the drill. As long as the chips are passing upwardly through the hole bored in the work piece, they will be confined within the flutes. Also, if the spacing of the lower or inner end of the drill bushing and the top of the work piece 19 is small, the combination of the natural helical shape of the chip and the confining action of the wall of the hole bored by the drill will serve to retain the chip within the drill flute for passage through the bore of the drill bushing and discharge at the top of the plate 20. However, there are many cases where a substantial space exists between the top of the work piece 19 and the inner end of the drill bushing because the size or shape of the work piece necessitates such spacing. In such cases the aforementioned factors of helical chip shape and chip confinement by bore walls may be ineffective to hold the chip in the drill flute, and the chip tends to slip or deflect out of the drill flute to an extent which results in contact of the chip with the end of the drill bushing, as illustrated in dotted lines at 30 in Fig. 2. When this occurs in the instant device, the chip is brought into engagement with the abrupt face 25 and the sharp cutting edges of one of the teeth 24 at the lower or inner end of the drill bushing, and is broken or cut incident to the rotation of the drill. The teeth 24 of the drill bushing are formed reversely relative to the direction of rotation of the drill, so that the chips are fed against the abrupt tooth faces 25 by the rotating drill. The size of the chip fragments which are cut or broken in this manner is small, and the fragments are free to fall, as upon the base plate 10 of the work holder. Consequently, they may be removed easily by means of a brush or of an air blast when an excessive quantity thereof has accumulated, and they need not be touched by hand.

This overcomes a difficulty in drill press operation of long standing, namely deflection of the curled chip by the drill bushing, and winding thereof around the drill in a manner which clogs the space between the plate 20 and block 12. Such clogging action may involve interference with required free access to the work piece, interference with drill lubrication, and necessity for the operator to pull out the clogged chip by hand, which is time-consuming and is also hazardous because of the danger of cutting the hands on the sharp edges of the chip.

It will be understood that the construction of the work holder and of the drill bushing and its mounting are illustrative only, and are not intended to be limiting, since the invention may assume other forms or embodiments within the scope and spirit of the appended claims.

I claim:

1. A drill bushing having a cylindrical body adapted to be mounted on a stationary member and notched at one end surface, each notch extending longitudinally and being defined by converging end faces of which one is gradually tapered and the other extends substantially parallel to the axis of said body.

2. A drill bushing having a cylindrical body adapted to be mounted upon a stationary member and having at least one tooth in its end surface, said tooth being defined in part by a longitudinally extending face interrupting said end surface and lying in a plane substantially parallel to the axis of the body.

3. A drill bushing having a cylindrical body adapted to be mounted on a stationary member and notched at one end, said notches defining substantialy V-shaped circumferentially spaced teeth, the faces of said teeth extending in acute angled relation to each other and each extending in acute angled relation to a plane perpendicular to the axis of said body.

4. A drill bushing having a cylindrical body adapted to be mounted on a stationary member and notched at one end to form a circumferential series of spaced similar teeth, each of said teeth having an abrupt face and a gradually tapering face and presenting sharp cutting edges at its apex and at the inner edge of said abrupt face.

5. A drill bushing for a rotating drill, comprising a cylindrical body adapted to be mounted on a stationary member and having a notched end surface providing a circumferential series of spaced teeth, each of said teeth having an undercut face counter-rotationally disposed relative to the rotative direction of said drill and having cutting edges at their radial apices and at the inner edges of said undercut faces.

6. A drill bushing having a tubular body adapted to be mounted on a stationary member for free rotation of a drill therein, one end surface of said body having a circumferential series of longitudinally projecting teeth therein, each presenting an abrupt face in counter-rotational direction relative to the direction of drill rotation.

7. A drill bushing for a rotating drill, comprising a cylindrical body adapted to be mounted on a stationary member and having a longitudinal abutment interrupting one end surface thereof and facing in a direction counter to that in which said drill rotates.

HAROLD R. JOHNSON.